United States Patent
Faruque et al.

(10) Patent No.: US 11,485,203 B2
(45) Date of Patent: Nov. 1, 2022

(54) DEPLOYABLE REINFORCEMENT FOR VEHICLE DOOR

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/176,768

(22) Filed: Feb. 16, 2021

(65) Prior Publication Data

US 2022/0258578 A1    Aug. 18, 2022

(51) Int. Cl.
*B60J 5/04*        (2006.01)

(52) U.S. Cl.
CPC .......... *B60J 5/0445* (2013.01); *B60J 5/0429* (2013.01); *B60J 5/0459* (2013.01)

(58) Field of Classification Search
CPC ........ B60J 5/0445; B60J 5/042; B60J 5/0429; B60J 5/0459; B60J 5/0437; B60J 5/0443; B60J 5/0455; B60J 5/0444; B60J 5/0047; B60J 5/0448
USPC ...................................................... 296/146.6
See application file for complete search history.

(56) References Cited

U.S. PATENT DOCUMENTS

| | | | | |
|---|---|---|---|---|
| 4,743,062 | A | * | 5/1988 | McLaren ............... B60J 5/0463 296/202 |
| 4,861,097 | A | * | 8/1989 | Wycech ................. B60J 5/0452 52/309.5 |
| 5,056,861 | A | | 10/1991 | Garnweidner et al. |
| 7,610,984 | B2 | | 11/2009 | Melz et al. |
| 7,735,901 | B2 | | 6/2010 | Melz et al. |
| 2020/0217111 | A1 | | 7/2020 | Choi |

FOREIGN PATENT DOCUMENTS

| DE | 19832076 A1 | * | 1/2000 | ............ B60J 5/0459 |
|---|---|---|---|---|
| DE | 19832076 A1 | | 1/2000 | |

* cited by examiner

*Primary Examiner* — Joseph D. Pape
*Assistant Examiner* — Veronica M Shull
(74) *Attorney, Agent, or Firm* — Frank A. MacKenzie; Bejin Bieneman PLC (57) ABSTRACT

A vehicle-door reinforcement includes a first beam elongated along an axis between a first end and a second end. The vehicle-door reinforcement includes a hinged beam elongated along the axis. The hinged beam includes a first segment and a second segment hinged to each other. The first segment is engaged with the first beam and the second segment is slideably engaged with the first beam. The vehicle-door reinforcement includes an actuator fixed to the first beam and connected to the second segment.

20 Claims, 6 Drawing Sheets

DEPLOYABLE REINFORCEMENT FOR VEHICLE DOOR

BACKGROUND

Vehicles may be subject to impact tests to test the movement of vehicle occupants. Such tests may be standardized by various governmental or industry organizations. Some test, for example, measure the door intrusion and/or the movement of vehicle occupants during vehicle impacts that move the vehicle occupants in cross-vehicle directions. These tests include side impact tests and oblique impact tests. For example, FMVSS 214 mandates static door intrusion requirement and dynamic impact limits on occupants of a vehicle. Some public domain organizations such as IIHS also test for kinematic control of occupants during dynamic side impacts.

DETAILED DESCRIPTION

A vehicle door includes a door panel. A first beam is elongated along an axis between a first end and a second end. The first end and the second end are fixed to the door panel. A hinged beam is elongated along the axis. The hinged beam includes a first segment and a second segment hinged to each other. The first segment is engaged with the first beam and the second segment is slideably engaged with the first beam. An actuator is fixed to the first beam and connected to the second segment.

The first segment and the second segment may each have a first end and a second end. The second ends may be hinged to each other. The first end of the first segment may be engaged with the first beam. The first end of the second segment may be slideably engaged with the first beam. The actuator may be connected to the first end of the second segment. The first end of the first segment may be fixed along the first beam. The first beam may have an outboard side and an inboard side, the hinged beam being on the outboard side and the actuator being on the inboard side. The first beam may include a slot elongated along the axis and the second segment may be slideably engaged with the slot. A cable may extend from the actuator through the slot to the second segment.

The first end of the first segment may be fixed along the first beam.

The first beam may have an outboard side and an inboard side, the hinged beam being on the outboard side and the actuator being on the inboard side. The first beam may include a slot elongated along the axis and the second segment may be slideably engaged with the slot. A cable may extend from the actuator through the slot to the second segment.

The first beam may include a slot elongated along the axis and the second segment is slideably engaged with the slot. A cable may extend from the actuator through the slot to the second segment.

The door panel may be an inner panel and the door may include an outer panel. The first beam and the hinged beam may be between the inner panel and the outer panel.

The actuator may be configured to pull the second segment toward the first segment to bow the hinged beam relative to the first beam.

The actuator may be a pyrotechnic actuator.

A pinned hinge may be between the first segment and the second segment.

A vehicle-door reinforcement includes a first beam elongated along an axis between a first end and a second end. A hinged beam is elongated along the axis. The hinged beam includes a first segment and a second segment hinged to each other. The first segment is engaged with the first beam and the second segment is slideably engaged with the first beam. An actuator is fixed to the first beam and connected to the second segment.

The first segment and the second segment may each have a first end and a second end. The second ends may be hinged to each other. The first end of the first segment may be engaged with the first beam. The first end of the second segment are slideably engaged with the first beam. The actuator may be connected to the first end of the second segment.

The first beam may have an outboard side and an inboard side. The hinged beam may be on the outboard side and the actuator may be on the inboard side.

The first end of the first segment may be fixed along the first beam.

With reference to the Figures, wherein like numerals indicate like parts throughout the several views, a reinforcement 12 for a vehicle door 14 is generally shown. The reinforcement 12 includes a first beam 16 elongated along an axis A between a first end 18 and a second end 20 (i.e., the first end 18 of the reinforcement 12 and the second end 20 of the reinforcement 12). The reinforcement 12 includes a hinged beam 22 elongated along the axis A. The hinged beam 22 includes a first segment 24 and a second segment 26 hinged to each other. The first segment 24 is engaged with the first beam 16 and the second segment 26 is slideably engaged with the first beam 16. The reinforcement 12 includes an actuator 28 fixed to the first beam 16 and connected to the second segment 26.

Figure 3:
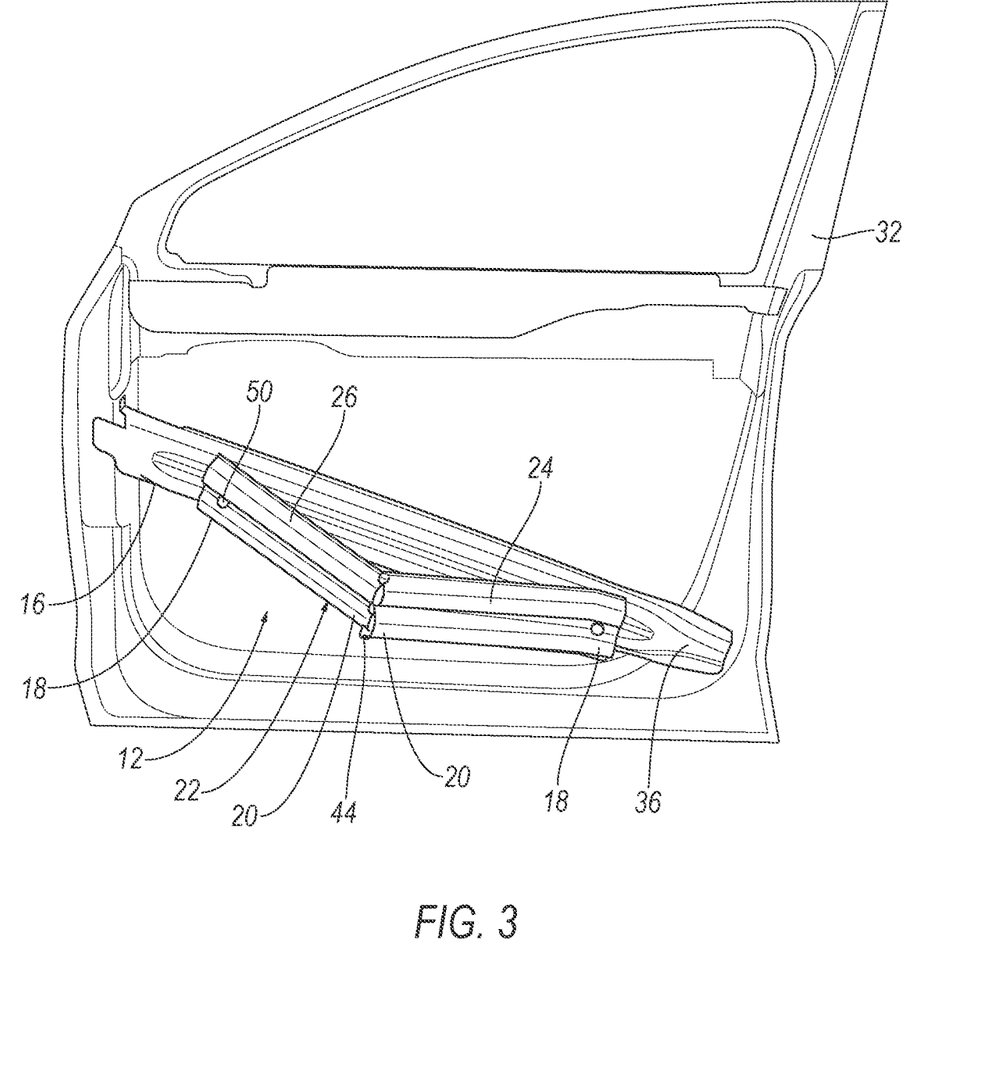
FIG. 3 is a side view of the inner panel with the reinforcement in the deployed position.

Since the second segment 26 is slideably engaged with the first beam 16 and the actuator 28 is fixed to the second segment 26, activation of the actuator 28 bows the reinforcement 12 away from the first beam 16, e.g., in a triangular shape. Specifically, the deployment of the reinforcement 12 creates a space between the hinged beam 22 and the first beam 16 to absorb energy during a side impact. During side impact, the hinged beam 22 can crumple due to the spacing between the hinged beam 22 and the first beam 16. For example, as shown in FIG. 3, the hinged beam 22 may deploy vehicle-outboard, i.e., toward the impacting vehicle 10, to receive the impact prior to the first beam 16 and to absorb energy during deformation toward the first beam 16.

Figure 1:
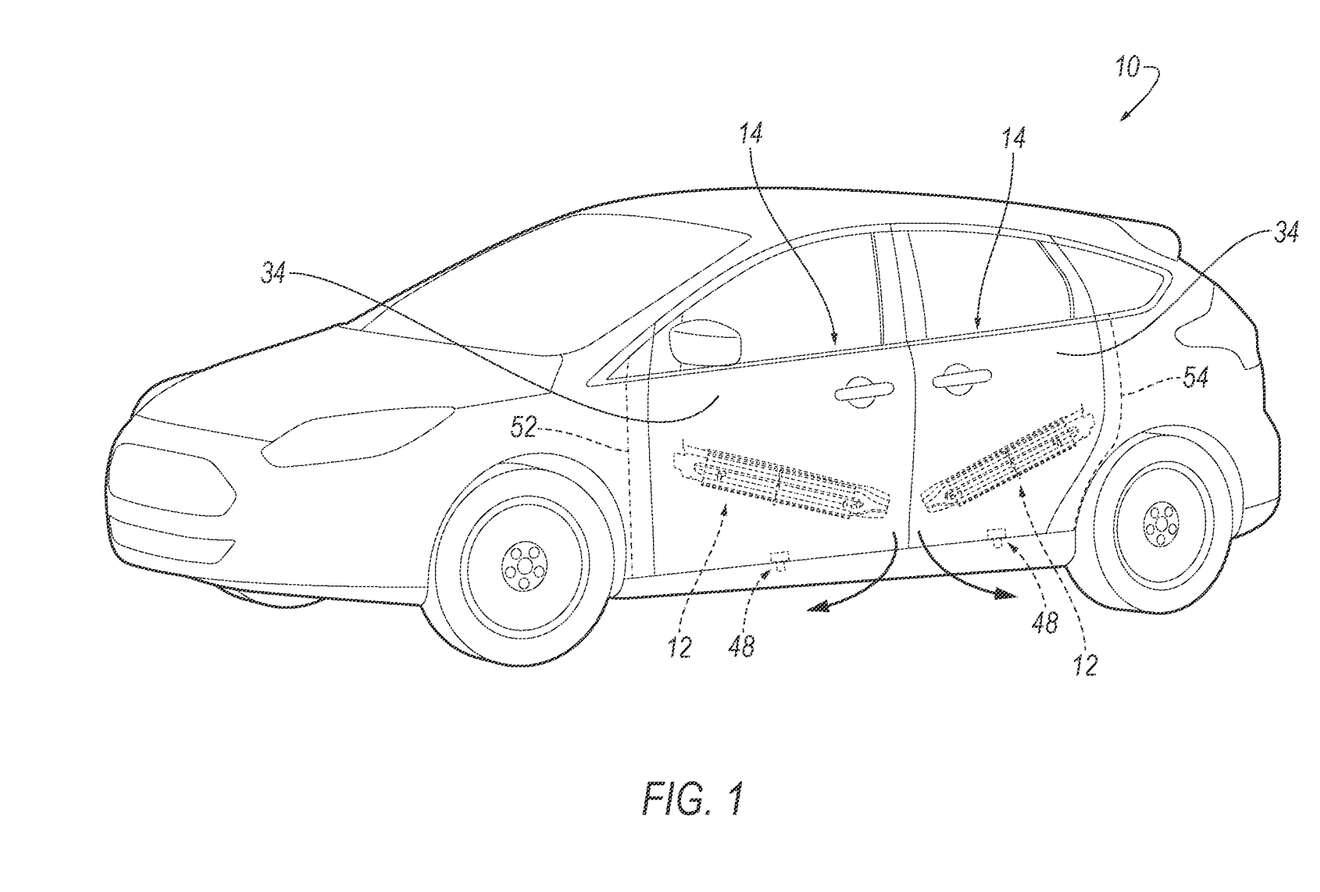
FIG. 1 is a perspective view of a vehicle including a reinforcement of a front door and a reinforcement of a rear door shown in hidden lines.

Any number of doors 14 of the vehicle 10, i.e., one or more vehicle doors 14, may include the reinforcement 12. For example, in the example shown in FIG. 1, two doors 14 each include the reinforcement 12. As one example, the reinforcement 12 may reinforce the vehicle door 14 in examples in which the vehicle door 14 is used in a B-pillarless configuration, e.g., a vehicle 10 that does not include a pillar between a front door 14 and a rear door 14, as shown in FIG. 1. Specifically, in FIG. 1, the front door 14 is hinged at a vehicle-forward end of the front door 14 and the rear door 14 is hinged at a vehicle-rearward end of the rear door 14. As shown in FIG. 1, the front door 14 and the rear door 14 both include the reinforcement 12 and the reinforcements 12 absorb energy in a side impact to provide reinforcement 12 in the B-pillarless configuration of the vehicle 10.

The vehicle 10 may be any suitable type of ground vehicle, e.g., a passenger or commercial automobile such as a sedan, a coupe, a truck, a sport utility, a crossover, a van, a minivan, a taxi, a bus, etc.

The vehicle 10 includes a vehicle frame (not numbered) and a vehicle body (not numbered). The vehicle frame may be of a unibody construction in which the vehicle frame is unitary with the vehicle body (including frame rails, pillars 52, 54, roof rails, etc.). As another example, the vehicle body and vehicle frame may have a body-on-frame construction (also referred to as a cab-on-frame construction) in which the vehicle body and vehicle frame are separate components, i.e., are modular, and the vehicle body is supported on and affixed to the vehicle frame. Alternatively, the vehicle frame and vehicle body may have any suitable construction. The vehicle frame and vehicle body may be of any suitable material, for example, steel, aluminum, and/or fiber-reinforced plastic, etc.

As set forth above, the vehicle 10 may be B-pillarless, as shown in FIG. 1. Specifically, the vehicle body may be B-pillarless. In such an example, the vehicle body may define one door opening that receives two doors, e.g., a front door 14 and a rear door 14. The front door 14 is hinged at the vehicle-forward end of the front door 14 at a front pillar 52 of the vehicle body. The rear door 14 is hinged at a vehicle-rearward end of the rear door 14 at a rear pillar 54 of the vehicle body. The vehicle body does not include a pillar between the front pillar 52 and the rear pillar 54. The doors 14 meet at a location between the front pillar 52 and the rear pillar 54 and may releasably latch to each other.

The vehicle body defines a passenger compartment to house occupants, if any, of the vehicle 10. The vehicle 10 includes one or more seats (not shown). The vehicle 10 may include any suitable number of seats. The seats may be arranged in the passenger cabin in any suitable position, i.e., as front seats, rear seats, third-row seats, etc. The seats may be movable relative to the floor to various positions, e.g., movable fore-and-aft and/or cross-vehicle 10. The seats may be of any suitable type, e.g., a bucket seat. Each reinforcement 12 may be adjacent one of the seats, i.e., positioned along a cross-vehicle 10 direction relative to the seat.

The doors 14 of the vehicle 10 are openable for occupants to enter and exit the passenger compartment. The roof rails contact a top edge of the doors. Each door 14 includes a trim panel (not shown) and at least one door panel, e.g., an inner panel 32 (also referred to as a "door inner") and an outer panel 34 (also referred to as a door outer"). The trim panel and the outer panel 34 are fixed relative to the inner panel 32. The trim panel is fixed opposite the outer panel 34 relative to the inner panel 32. The trim panel is inboard relative to the inner panel 32, and the outer panel 34 is outboard relative to the inner panel 32. The door 14 includes a window opening, which may be closed by a window when the window is in a fully raised position. The window opening is defined by the trim panel and inner panel 32 on a bottom edge and either by the inner panel 32 or by the vehicle body, e.g., a pillar and/or the roof rail. The outer panel 34 faces outboard relative to the vehicle 10. The outer panel 34 may present a class-A surface, i.e., a surface specifically manufactured to have a high-quality, finished aesthetic appearance free of blemishes. The outer panel 34 may be metal (such as steel, aluminum, etc.) or polymeric (such as fiber reinforced plastic composite, etc.). The inner panel 32 may be metal (such as steel, aluminum, etc.) or polymeric (such as fiber reinforced plastic composite, etc.). The inner panel 32 provides structural rigidity for the outer panel 34. The outer panel 34 may provide a mounting location for components of the door. The trim panel may be a material suitable for an interior of the vehicle 10, such as vinyl, plastic, leather, wood, etc.

With reference to FIG. 1, the door 14 and the vehicle frame, e., a rocker, may include a latching assembly 48 for latching the door 14 to the vehicle frame. For example, the latching assembly 48 may include a striker on the vehicle frame and a latch on the door that releasably engages the striker. In the example shown in FIG. 1, the vehicle with the B-pillarless configuration includes a latching assembly 48 for both the front door 14 and the rear door 14.

Figure 2:
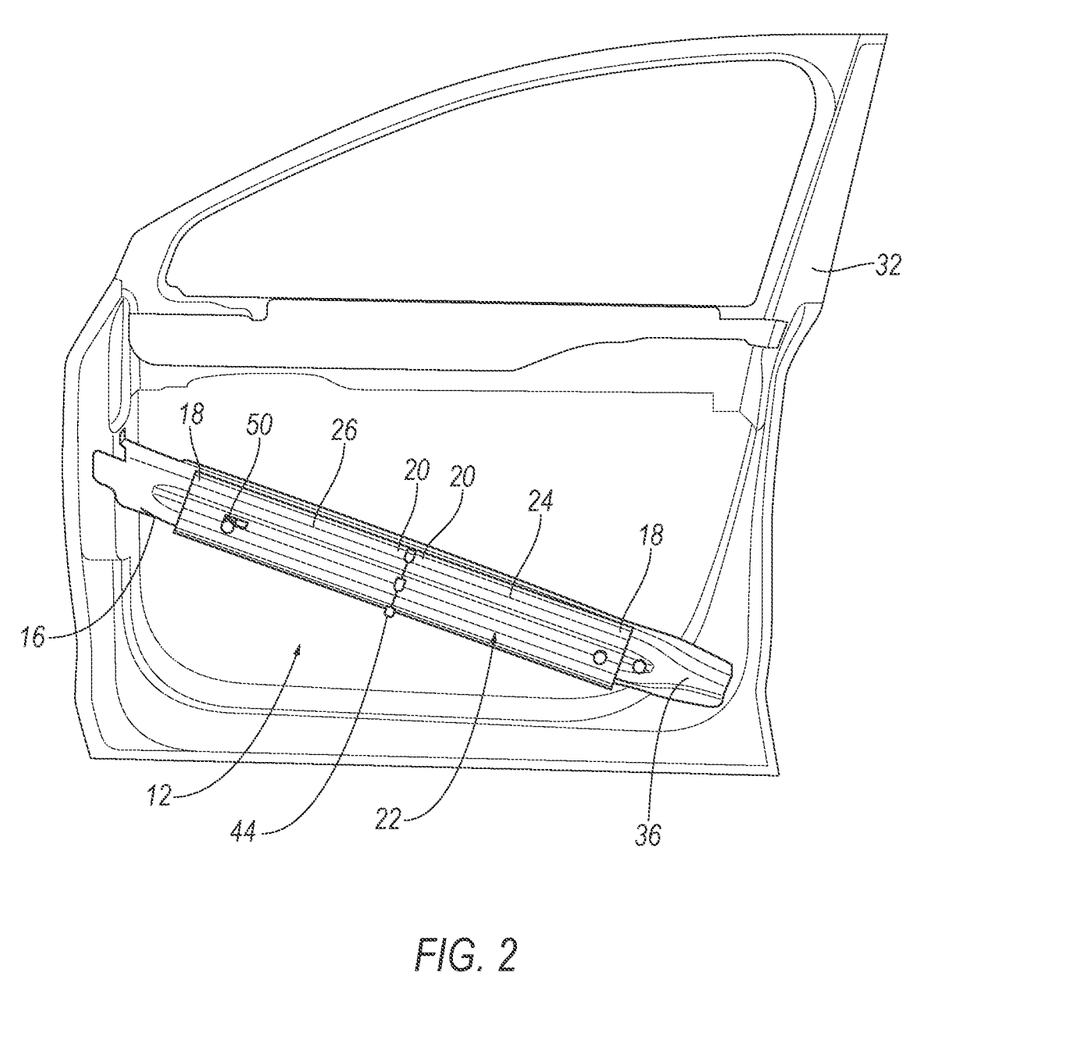
FIG. 2 is a side view of an inner panel of the front door and the reinforcement in an undeployed position.
Figure 4:
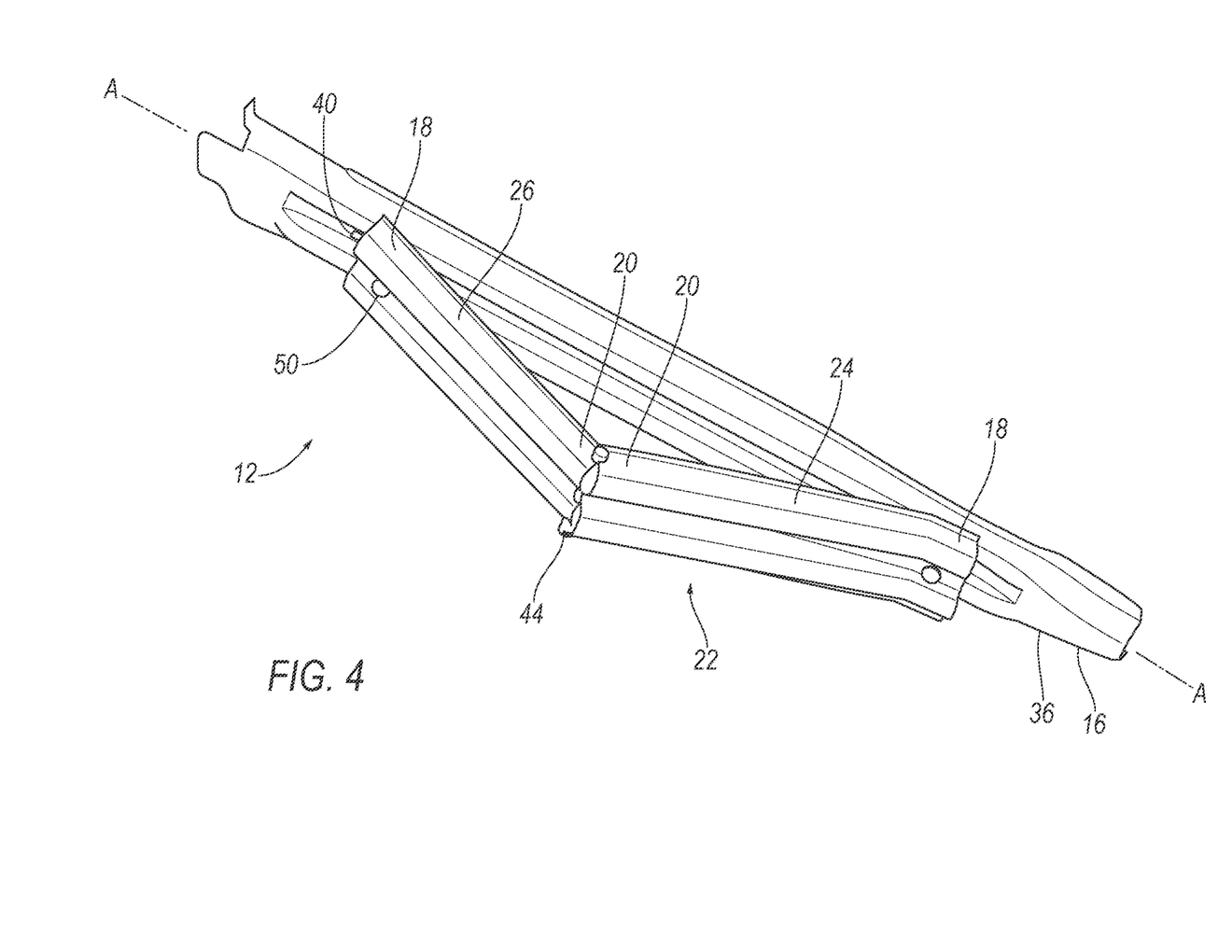
FIG. 4 is a perspective view of the reinforcement in the deployed position.
Figure 5:
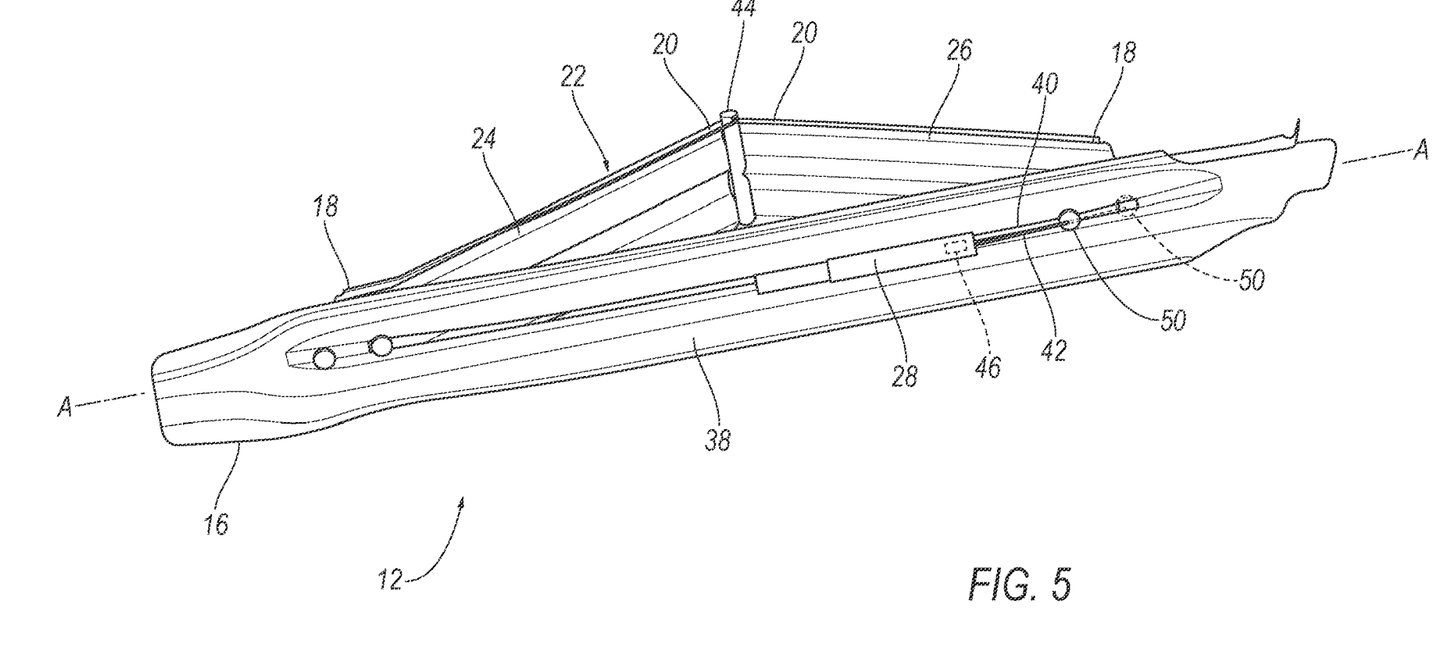
FIG. 5 is another perspective view of the reinforcement in the deployed position.

With reference to FIGS. 1-3, the reinforcement 12 may be disposed between the inner panel 32 and the outer panel 34. Specifically, the first beam 16 and the hinged beam 22 are between the inner panel 32 and the outer panel 34. Specifically, the reinforcement 12 may be concealed between the inner panel 32, the outer panel 34, and/or the trim panel, i.e., not visible to an occupant during ingress, egress, and occupancy of the vehicle 10. Both the first beam 16 and the hinged beam 22 may remain between the inner panel 32 and the outer panel 34 when the reinforcement 12 is in an undeployed position (FIGS. 1 and 2) and the deployed position (FIGS. 3-5).

With reference to FIGS. 1-3, the reinforcement 12 is fixed to the door 14. Specifically, the first end 18 and the second end 20 of the first beam 16 may be fixed to the door 14. The first end 18 and the second end 20 of the first beam 16, for example, may be fixed to the inner panel 32 of the door 14. The first beam 16 may be fixed to the door 14 with fasteners, welding, or in any other suitable fashion.

The reinforcement 12 may extend diagonally across the door. In the example shown in the figures, a vehicle-forward end of the reinforcement 12 may be higher than a vehicle-rearward end of the reinforcement 12. This arrangement maximizes the length of the reinforcement 12 and may allow for increased length of the hinged beam 22. The reinforcement 12 may be generally in a vehicle-fore-and-aft plane.

The first beam 16 has an outboard side 36 and an inboard side 38 where "outboard" and "inboard" are with reference to the vehicle 10. Specifically, the outboard side 36 faces outboard relative to the rest of the vehicle 10 and the inboard side 38 faces inboard relative to the rest of the vehicle 10, e.g., faces toward the passenger compartment. The hinged beam 22 may be on the outboard side 36 of the first beam 16. In such an example, the hinged beam 22 deploys vehicle-outboard. Specifically, the hinged beam 22 deploys toward the outer panel 34. The actuator 28 may be on the inboard side 38 of the first beam 16. In the example shown in the figures in which the hinged beam 22 is on the outboard side 36 and the actuator 28 is on the inboard side 38, the first beam 16 may include a slot 40 and a cable 42 (FIG. 5) extending from the actuator 28 through the slot 40 to the hinged beam 22, e.g., to the second segment 26. In such an example, the slot 40 may be elongated along the axis A of the hinged beam 22 and the second segment 26 of the hinged beam 22 is slideably engaged with the slot 40. The slot 40, for example, may extend through the first beam 16, i.e., through the inboard side 38 and the outboard side 36. The hinged beam 22 may include a pin 50 that is slideable along the slot 40.

The hinged beam 22 is supported on the first beam 16. Specifically, the first beam 16 supports the hinged beam 22 on the door 14. The hinged beam 22 moves relative to the first beam 16 and the door 14 from the undeployed position to the deployed position.

As set forth above, the hinged beam 22 includes the first segment 24 and the second segment 26. The first segment 24 and the second segment 26 each have a first end 18 and a second end 20. The first segment 24 and the second segment 26 pivot relative to each other at the second ends 20. For example, the second ends 20 may be hinged to each other, e.g., at a hinge 44 as described further below.

The first end 18 of the first segment 24 is fixed to the first beam 16 and the first end 18 of the second segment 26 is slideably engaged with the first beam 16. Specifically, the first end 18 of the first segment 24 is fixed along the first beam 16. The first end 18 of the first segment 24 does not move relative to the first beam 16. The first end 18 of the first segment 24 may be fixed to the first beam 16 in any sufficient manner, e.g., fastened, welded, etc.

The first end 18 of the second segment 26 may slide relative to the first beam 16 when force is applied to the first end 18 of the second segment 26 in a direction toward the first end 18 of the first segment 24. For example, the first end 18 of the second segment 26 may be slideably engaged with the slot 40 in the first beam 16. As an example, the first end 18 of the second segment 26 may include a pin that is slideably fixed to the slot 40, i.e., retained in the slot 40 and slideable along the slot 40. The first end 18 of the second segment 26 may be releasably secured to the first beam 16. In such an example, the first end 18 of the second segment 26 remains stationary relative to the first beam 16 until sufficient force is applied to the first end 18 of the second segment 26 For example, the first end 18 of the second segment 26 may include a frangible connection to the beam, e.g., a tack weld, a flange, etc., designed to break when the actuator 28 activates to pull the first end 18 of the second segment 26 toward the first end 18 of the first segment 24. In addition or in the alternative, the hinge 44 may be designed to bend only when sufficient force is applied to the first end 18 of the second segment 26.

When the actuator 28 is activated, the actuator 28 pulls the first end 18 of the second segment 26 toward the first end 18 of the first segment 24 to slide the second end 20 of the second segment 26 along the beam toward the first end 18 of the first segment 24. This movement causes the first segment 24 and the second segment 26 to pivot at the second ends 20 of the first segment 24 and the second segment 26 causing the hinged beam 22 to bow outwardly away from the first beam 16. The first beam 16 is rigid relative to the hinged beam 22 to act as a reaction surface as the actuator 28 activates to pull the first end 18 of the second segment 26 toward the first end 18 of the first segment 24.

The hinge 44 between the second end 20 of the first segment 24 and the second end 20 of the second segment 26 allows the second ends 20 to pivot relative to each other when the actuator 28 activates to pull the first end 18 of the second segment 26 toward the first end 18 of the first segment 24. As an example, the reinforcement 12 may include a pinned hinge between the first segment 24 and the second segment 26. The pinned hinge includes a knuckle on the second end 20 of the first segment 24, a knuckle on the second end 20 of the second segment 26, and a pin rotatably engaging the knuckles to each other. As another example, the hinge 44 may be a living hinge, i.e., a weakened line that is unitary with the first segment 24 and the second segment 26 to encourage bending between the first segment 24 and the second segment 26 when the actuator 28 activates to pull the first end 18 of the second segment 26 toward the first end 18 of the first segment 24.

With reference to FIG. 5, the actuator 28 is fixed to the first beam 16. The actuator 28 may be fixed to the first beam 16 in any suitable fashion, e.g., with fasteners, welding, etc.

The actuator 28 is connected to the first end 18 of the second segment 26. For example, the reinforcement 12 may include a cable 42 extending through the slot 40 from the actuator 28 to the first end 18 of the second segment 26. The actuator 28 is configured to pull the second segment 26 toward the first segment 24 to bow the hinged beam 22 relative to the first beam 16. For example, in the example shown in the figures including the cable 42, the actuator 28 is configured to pull the cable 42 to pull the second segment 26 toward the first segment 24. Alternatively, the actuator 28 may be connected to the first end 18 of the second segment 26 in any suitable way such that the actuator 28 pulls the second segment 26 toward the first segment 24 when the actuator 28 is activated.

The actuator 28 may be a pyrotechnic actuator. In such an example the actuator 28 includes a pyrotechnic charge that activates the actuator 28 to pull the first end 18 of the second segment 26 toward the first end 18 of the first segment 24. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

The actuator 28 may be, for example, linear actuator (as shown in the figures) or a rotary actuator. In the example in which the actuator 28 is a linear actuator, the linear actuator includes a piston in a tube. The pyrotechnic charge moves the piston in the tube. The cable 42 may be connected to the piston. In the example in which the actuator 28 is a rotary actuator, the actuator 28 may include a pyrotechnic charges rotates a shaft connected to the cable 42 such that the cable 42 wraps around the shaft; a piston linkage, in which the pyrotechnic charge for example, drives a piston attached to the cable 42; a ball-in-tube linkage, in which an pyrotechnic charge propels a ball or balls over a cogwheel connected to the cable 42; or any other suitable type.

The reinforcement 12 may include a locking mechanism 46 that allows the hinged beam 22 to move to the deployed position and thereafter prevents return of the hinged beam 22 to the undeployed position. In other words, the locking mechanism 46 maintains the hinged beam 22 in the deployed position. As an example, the actuator 28 may include the locking mechanism 46. For example, the locking mechanism 46 may engage the cable 42 or an internal component of the actuator 28 in the deployed position to prevent movement of the cable 42 toward the undeployed position.

Figure 6:
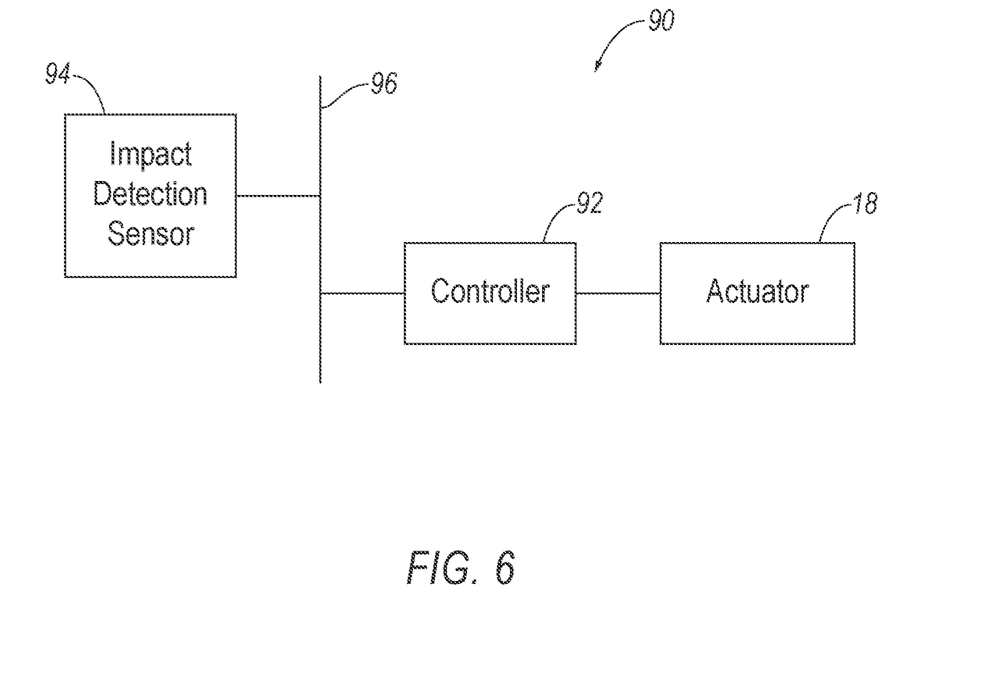
FIG. 6 is a block diagram of a control system for the vehicle.

With reference to FIG. 6, the vehicle 10 may include a control system 90. The control system 90 may include a controller 92, an impact detection sensor 94, and the actuator 18, in communication through a communication network 96.

The impact detection sensor 94 may be in communication with the controller 92. The impact detection sensor 94 is programmed to detect an impact to the vehicle 10. The impact detection sensors 94 may be of various types, e.g., pressure sensor, acceleration sensor, vision sensor, etc. The impact detection sensor 94 may be located at numerous points in or on the vehicle 10. When the vehicle impact occurs, the controller 92 may receive one or more signals from the impact detection sensors 94 indicating the vehicle impact.

The controller 92 may be a microprocessor-based computing device implemented via circuits, chips, or other electronic components. The controller 92 may include a processor, memory, etc. The memory of the controller 92 may store instructions executable by the processor and the processor may read the instructions from the memory and execute the instructions.

The control system 90 may transmit signals through the communications network 96 such as a controller area network (CAN) bus, Ethernet, Local Interconnect Network (LIN), and/or by any other wired or wireless communications network.

The controller 92 may be programmed to activate the actuator 28 in response to detecting a vehicle impact, e.g., a side impact. For example, in response to receiving the signals from the impact detection sensors 94, the controller 92 may initiate the activation of the actuator 28. In other words, when the impact detection sensors 94 detect a vehicle impact, the controller 92 may send a signal to activate the actuator 28. In the example shown in the figures, the activation of the actuator 28 pulls the cable 42 to deploy the hinged beam 22 to the deployed position.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. The adjectives "first," "second," etc., are used herein as identifiers and are not used to indicate order or importance. Many modifications and variations of the present disclosure are possible in light of the above teachings, and the disclosure may be practiced otherwise than as specifically described.

What is claimed is:

1. A vehicle door, comprising:
a door panel;
a first beam elongated along an axis between a first end and a second end, the first end and the second end being fixed to the door panel;
a hinged beam elongated along the axis, the hinged beam including a first segment and a second segment hinged to each other, the first segment being engaged with the first beam and the second segment being slideably engaged with the first beam; and
an actuator fixed to the first beam and connected to the second segment.

2. The vehicle door as set forth in claim 1, wherein the first segment and the second segment each have a first end and a second end, the second ends being hinged to each other, the first end of the first segment being engaged with the first beam, and the first end of the second segment being slideably engaged with the first beam.

3. The vehicle door as set forth in claim 2, wherein the actuator is connected to the first end of the second segment.

4. The vehicle door as set forth in claim 3, wherein the first end of the first segment is fixed along the first beam.

5. The vehicle door as set forth in claim 3, wherein the first beam has an outboard side and an inboard side, the hinged beam being on the outboard side and the actuator being on the inboard side.

6. The vehicle door as set forth in claim 5, wherein the first beam includes a slot elongated along the axis and the second segment is slideably engaged with the slot, and further comprising a cable extending from the actuator through the slot to the second segment.

7. The vehicle door as set forth in claim 1, wherein the first end of the first segment is fixed along the first beam.

8. The vehicle door as set forth in claim 1, wherein the first beam has an outboard side and an inboard side, the hinged beam being on the outboard side and the actuator being on the inboard side.

9. The vehicle door as set forth in claim 8, wherein the first beam includes a slot elongated along the axis and the second segment is slideably engaged with the slot, and further comprising a cable extending from the actuator through the slot to the second segment.

10. The vehicle door as set forth in claim 1, wherein the first beam includes a slot elongated along the axis and the second segment is slideably engaged with the slot.

11. The vehicle door as set forth in claim 10, further comprising a cable extending from the actuator through the slot to the second segment.

12. The vehicle door as set forth in claim 1, wherein the door panel is an inner panel and the door includes an outer panel, the first beam and the hinged beam being between the inner panel and the outer panel.

13. The vehicle door as set forth in claim 1, wherein the actuator is configured to pull the second segment toward the first segment to bow the hinged beam relative to the first beam.

14. The vehicle door as set forth in claim 1, wherein the actuator is a pyrotechnic actuator.

15. The vehicle door as set forth in claim 1, further comprising a pinned hinge between the first segment and the second segment.

16. A vehicle-door reinforcement, comprising:
- a first beam elongated along an axis between a first end and a second end;
- a hinged beam elongated along the axis, the hinged beam including a first segment and a second segment hinged to each other, the first segment being engaged with the first beam and the second segment being slideably engaged with the first beam; and
- an actuator fixed to the first beam and connected to the second segment.

17. The vehicle-door reinforcement as set forth in claim 16, wherein the first segment and the second segment each have a first end and a second end, the second ends being hinged to each other, the first end of the first segment being engaged with the first beam, and the first end of the second segment being slideably engaged with the first beam.

18. The vehicle-door reinforcement as set forth in claim 17, wherein the actuator is connected to the first end of the second segment.

19. The vehicle-door reinforcement as set forth in claim 16, wherein the first beam has an outboard side and an inboard side, the hinged beam being on the outboard side and the actuator being on the inboard side.

20. The vehicle-door reinforcement as set forth in claim 16, wherein the first end of the first segment is fixed along the first beam.

\* \* \* \* \*